(12) United States Patent
Loesch et al.

(10) Patent No.: US 11,581,634 B2
(45) Date of Patent: Feb. 14, 2023

(54) METHOD AND APPARATUS FOR RECOGNIZING AN ABSORPTIVE RADOME COATING

(71) Applicant: Robert Bosch GmbH, Stuttgart (DE)

(72) Inventors: Benedikt Loesch, Stuttgart (DE); Maija Chabaud, Ludwigsburg (DE); Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 355 days.

(21) Appl. No.: 17/011,697

(22) Filed: Sep. 3, 2020

(65) Prior Publication Data
US 2021/0098868 A1 Apr. 1, 2021

(30) Foreign Application Priority Data
Sep. 27, 2019 (DE) .................... 10 2019 214 949.9

(51) Int. Cl.
| | |
|---|---|
| *H01Q 1/42* | (2006.01) |
| *G01S 13/931* | (2020.01) |
| *G01S 7/40* | (2006.01) |
| *H01Q 1/32* | (2006.01) |
| *H04W 24/06* | (2009.01) |
| *G01S 13/58* | (2006.01) |
| *G01S 13/88* | (2006.01) |

(52) U.S. Cl.
CPC ............ *H01Q 1/42* (2013.01); *G01S 7/4004* (2013.01); *G01S 7/4039* (2021.05); *G01S 13/584* (2013.01); *G01S 13/88* (2013.01); *G01S 13/931* (2013.01); *H01Q 1/3233* (2013.01); *H04W 24/06* (2013.01)

(58) Field of Classification Search
None
See application file for complete search history.

(56) References Cited

U.S. PATENT DOCUMENTS

| | | | | |
|---|---|---|---|---|
| 6,469,659 | B1 * | 10/2002 | Lajiness | G01S 7/4004 342/91 |
| 6,611,227 | B1 * | 8/2003 | Nebiyeloul-Kifle | G01S 7/412 342/195 |
| 2002/0130811 | A1 * | 9/2002 | Voigtlaender | G01S 7/4004 342/162 |

(Continued)

FOREIGN PATENT DOCUMENTS

| | | |
|---|---|---|
| DE | 10 2009 001 231 A1 | 9/2010 |
| JP | 2005-166424 A | 6/2005 |

*Primary Examiner* — Peter M Bythrow
(74) *Attorney, Agent, or Firm* — Maginot, Moore & Beck LLP

(57) ABSTRACT

A method and an apparatus for recognizing an absorptive radome coating on an apparatus for emitting electromagnetic radiation and receiving partial radiation reflected at objects is disclosed. The radome covers at least one antenna of the apparatus. A mixer mixes a frequency-modulated transmission signal with the signal received by the at least one antenna, the mixed product of the mixer is subjected to analog-to-digital conversion, the digitized signal is transformed into a two-dimensional spectrum, and the two-dimensional spectrum is mapped with a transfer function. The two-dimensional spectrum that was mapped with the transfer function is correlated with correlation matrices in order to carry out pattern recognition.

19 Claims, 3 Drawing Sheets

(56) References Cited

U.S. PATENT DOCUMENTS

| | | | |
|---|---|---|---|
| 2011/0298656 A1* | 12/2011 | Bechler | G01S 13/931 342/26 R |
| 2012/0032838 A1* | 2/2012 | Heilmann | G01S 13/95 342/192 |
| 2012/0049860 A1* | 3/2012 | Heilmann | G01S 13/424 324/629 |
| 2012/0268317 A1* | 10/2012 | Himmelstoss | G01S 13/34 342/192 |
| 2013/0015999 A1* | 1/2013 | Alland | G01S 13/931 342/70 |
| 2015/0338508 A1* | 11/2015 | Chabaud | G01S 13/343 342/173 |
| 2017/0059695 A1* | 3/2017 | Fetterman | G01S 13/726 |
| 2017/0269196 A1* | 9/2017 | Millar | G01S 13/931 |
| 2019/0025404 A1* | 1/2019 | Farmer | G01S 7/40 |
| 2020/0241111 A1* | 7/2020 | Fetterman | G01S 7/40 |
| 2021/0373125 A1* | 12/2021 | Eskowitz | G01S 7/4039 |

* cited by examiner

METHOD AND APPARATUS FOR RECOGNIZING AN ABSORPTIVE RADOME COATING

This application claims priority under 35 U.S.C. § 119 to application no. DE 10 2019 214 949.9, filed on Sep. 27, 2019 in Germany, the disclosure of which is incorporated herein by reference in its entirety.

The present disclosure relates to a method and an apparatus for recognizing an absorptive radome coating on an apparatus for emitting electromagnetic radiation and receiving partial radiation reflected at objects, wherein the radome covers at least one antenna of the apparatus, and wherein a mixer mixes a frequency-modulated transmission signal with the signal received by the at least one antenna, the mixed product of the mixer is subjected to analog-to-digital conversion, the digitized signal is transformed into a two-dimensional spectrum, and, in a first step, the two-dimensional spectrum is mapped with a transfer function and, in the second step, the two-dimensional spectrum that was mapped with the transfer function is correlated with correlation matrices in order to carry out a pattern recognition.

BACKGROUND

DE 10 2009 001 231 A1 discloses an FMCW radar locating apparatus comprising an antenna covered by a radome, a mixer for mixing a frequency-modulated transmission signal with a signal received by the antenna, a device for recording the mixed product of the mixer as a time-dependent signal, a device for calculating the spectrum of the time-dependent signal, and a device for detecting a reflective coating on the radome, wherein the device for detecting the reflective coating is configured to analyze the time-dependent signal and to ascertain the extent of the reflection at the radome on the basis of the amplitude of said signal.

SUMMARY

The present disclosure is directed to a method and an apparatus for recognizing an absorptive radome coating of an apparatus for emitting electromagnetic radiation and receiving partial radiation reflected by the objects. It is thereby possible reliably to recognize sensor blindness or to recognize range degradation of the system and thus to make a quantified statement about possible losses in performance of the object detection system.

Absorptive radar sensor coatings or absorbent radar sensor coatings have the disadvantage that only a small part of emitted transmission power is reflected by the sensor coating and, consequently, the coating on the radome is not recognizable by way of specific reflection signals, rather the emitted power is partly absorbed, that is to say that the energy is consumed by the coating, with the result that a recognition of absorptive radome coatings or absorbent radome coatings cannot be recognized in a trivial manner. A way in which such radome coatings can nevertheless be recognized by the analysis of internal noise signals is demonstrated in the context of the present disclosure.

Furthermore, it is advantageous to provide a corresponding apparatus and configurations of the apparatus in accordance with the described method features according to the disclosure.

Provision is advantageously made for the output signals of the radio-frequency device of such a sensor to be transformed into a two-dimensional spectrum after digitization.

Provision can advantageously be made for the two-dimensional spectrum to be a velocity-distance spectrum.

The two-dimensional spectrum can either be a spectrum having continuous values firstly in the direction of the sensor distances and in the second dimension with regard to the object relative velocities; however, it is also possible for the two-dimensional spectrum to have discrete values on account of a discrete transformation both in the first dimension, namely the object distances, and in the second dimension, the object relative velocities, and thus for a discrete two-dimensional spectrum to be present.

Furthermore, it is advantageous for the transfer function to define the noise level in the two-dimensional spectrum, in particular by use of a significance level. The requirements in respect of a suitable transfer function substantially consists in using a continuous and monotonically rising or monotonically falling function. It has been found in practice that the spectral distribution of the received radar powers can be described by a $chi^2$ function. Therefore, it is advantageous to carry out a $chi^2$ test with the aid of a distribution function such as is known from statistics. The distribution function here indicates the probability distribution of the noise level in the two-dimensional spectrum. The significance level of the distribution function describes that all noise power values are below the chosen level. In this case, by way of example, the significance level can be chosen such that the noise level covers 50%. In accordance with one advantageous development of the disclosure, it can be advantageous to vary the significance level of the distribution function in order to set the noise level suitably.

Furthermore, it is advantageous that reflective objects are detected by the pattern recognition in the two-dimensional spectrum that was mapped with the transfer function. The two-dimensional spectrum, which can be a discrete two-dimensional spectrum, in particular, is mapped cell by cell with the transfer function, as a result of which it is possible to define the noise level under consideration in the spectrum and the noise can be reduced as much as possible, but without masking out object detections.

Furthermore, it is advantageous that the pattern recognition searches for linear correlations in the two-dimensional spectrum. In this regard, given a suitable choice of a modulation of the radar sensor, it is possible to represent a detected object in the two-dimensional spectrum by a falling straight line, that is to say a straight line having a negative gradient. Therefore, it is advantageous that the pattern recognition in the second step of the characterizing feature is searched for correlations with falling, linear patterns.

Furthermore, it is advantageous that the radome coating is determined by determining the maxima of a cross-correlation from values of the two-dimensional spectrum that was mapped with the transfer function together with values of the correlation matrix. It is particularly advantageous that the pattern recognition is carried out by means of correlation matrices. To that end, various correlation matrices having for example line segments with a falling form can be stored in the device. Depending on the modulation chosen, it is also possible to store other forms in the correlation matrices.

Furthermore, it is advantageous that the transfer function is variable and is varied depending on the recognized objects. In this regard, it is advantageous that if no or only a few objects are recognized in the two-dimensional spectrum, to vary the transfer function such that more noise is permitted, but more object data, too, can be evaluated as a result. If a radome coating having absorptive properties arises on the radome surface, then the reception level falls and this drop in the reception level can be recognized by variation of the significance level of the noise level and the degree of losses in performance can be estimated. This also affords the possibility optionally of being able to turn off the radar sensor in a timely manner before it yields signals that are no longer reliable, but nevertheless of being able to operate said radar sensor for as long as is still permitted by the system degradation.

Furthermore, it is advantageous that the significance level of the distribution function is varied at predetermined distances. The damping of the radome coating can be deduced from the value of the significance level at which the signal is swamped in noise.

In the case of absorptive radome coatings, it emerges that only specific objects yield signal echoes in the field of view of the sensor. This has the effect that only a few objects from the field of view of the sensor are present in the measurement and the processing two-dimensional spectrum is only weakly occupied by backscattered radar signals. On account of the physical properties of the sensor-measured object properties such as distance and relative velocity, these form specific patterns in the two-dimensional spectrum. These patterns can be detected by various methods such as pattern matching or contour recognition and the absorptive sensor coating recognition can thus be improved.

The use of the spectra measured for sensor functions obviates the need to effect separate measurements for radome coating recognitions. Consequently, operating time is saved and the thermal balance of the sensor is improved. The use of only weakly occupied spectra obviates the need for a relative measurement of the reception levels since signal and noise are present in the two-dimensional spectra.

Particularly suitable sensors for this purpose are radar sensors and lidar sensors; however, it is also conceivable, in principle, to apply this to other sensor concepts. By applying different patterns such as stationary, moving and extensive objects, it is furthermore possible to improve the object classification by using the properties of the detected targets with regard to their extent in the distance direction or relative velocity direction of the two-dimensional spectrum.

What is of particular importance is the realization of the method according to the disclosure in the form of a control element provided for a control unit of an adaptive cruise control of a motor vehicle. In this case, there is stored on the control element a program that is executable on a computing device, in particular on a microprocessor or signal processor, and is suitable for carrying out the method according to the disclosure. In this case, therefore, the disclosure is realized by a program stored on the control element, and so this control element provided with a program constitutes the disclosure in the same way as the method that the program is suitable for carrying out. The control element employed can be, in particular, an electrical storage medium, for example a read-only memory. Further features, application possibilities and advantages of the disclosure are evident from the following description of exemplary embodiments of the disclosure which are illustrated in the figures of the drawing. In this case, all features described or illustrated, by themselves or in any desired combination, form the subject matter of the disclosure, independently of their combination, their wording, or illustration in the description or the drawings.

Also advantageous is a computer program product or computer program comprising program code that can be stored on a machine-readable carrier or storage medium such as a semiconductor memory, a hard disk storage device or an optical storage device and is used for carrying out, implementing and/or controlling the steps of the method according to any of the embodiments described above, particularly when the program product or program is executed on a computer, a programmable control unit or a similar apparatus.

BRIEF DESCRIPTION OF THE DRAWINGS

Exemplary embodiments of the disclosure are explained below with reference to drawings.

In the figures.

DETAILED DESCRIPTION

Figure 1:
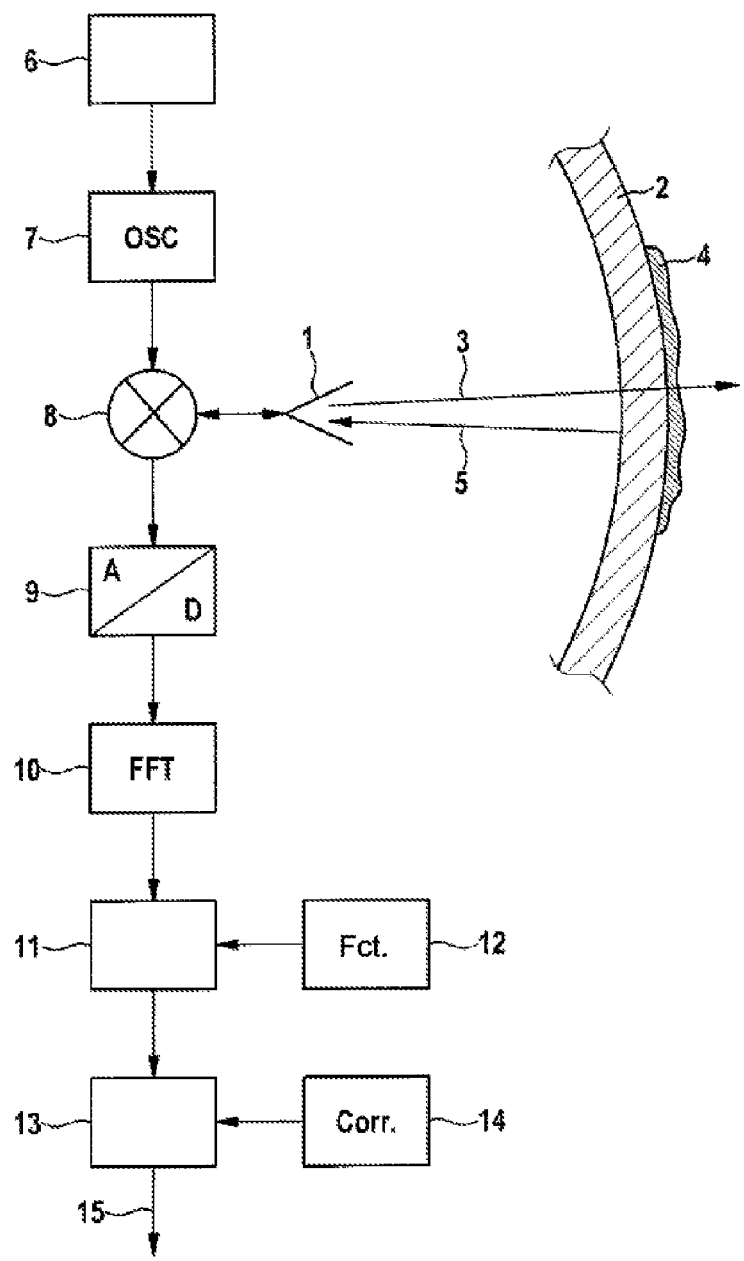
FIG. 1 shows a schematic block diagram of an apparatus according to the disclosure.

FIG. 1 shows an exemplary block diagram of an apparatus according to the disclosure for emitting electromagnetic radiation and receiving partial radiation reflected at objects. An antenna 1 can be discerned, which antenna is operated as a monostatic antenna in the example illustrated, that is to say as an antenna that can both transmit and receive. Alternatively, it is also possible to implement the disclosure in a bistatic system, by providing respectively separate antennas for transmitting and receiving the electromagnetic radiation.

An oscillator 7 is operated here to provide signals at a carrier frequency of the apparatus. For this purpose, it is possible for signals from an oscillator controller 6 to be fed to the oscillator 7. Said oscillator controller 6 can keep the generated frequency constant, for example, but also, according to predetermined patterns, can make it linearly rise, fall or regulate it to be constant in a piecewise manner, depending on what modulation pattern is intended to be emitted. The transmission signal generated by means of the oscillator 7 is conducted to the mixer 8, which also serves as a transmit and receive switch and forwards the transmission signal to the antenna 1.

The antenna 1 emits the electromagnetic transmission signal 3, which in normal operation penetrates through the radome 2 and has the task of detecting objects in the sensor environment. Objects in the sensor environment reflect the transmission radiation 3 back to the transmitter and are received as reception radiation 5 by the transmitting and receiving antenna 1 after they have passed through the radome 2 once again. Reception signals that were received by the antenna 1 are fed to the mixer 8 by said signals being mixed with the transmission signals and demodulated. The mixer 8 generates an intermediate frequency signal, which is output to a downstream analog-to-digital converter 9.

After the digitization of the intermediate frequency signal in the analog-to-digital converter, the signal is subjected to a device for Fourier transformation, in particular a discrete and two-dimensional Fourier transformation, whereupon the device 10 outputs a spectrum or a two-dimensional spectrum, which is processed further.

The radome 2 can be for example a covering of the apparatus according to the disclosure that protects the components against weather influences and mechanical influences. Furthermore, it is also conceivable for said radome 2 to be embodied in a lens-shaped fashion and thus also additionally to have focusing properties for the emitted and received electromagnetic radiation.

If the vehicle becomes dirty during driving operation or it is operated in rain or in snow, then it is possible for an absorptive coating 4 or an absorbent coating 4 to adhere on the sensor radome 2, which coating absorbs both the emitted transmission radiation and the reception radiation to be received and converts them into heat loss within the coating. Since reflection signals are hardly generated by absorptive coatings 4, it is very difficult to recognize absorptive coatings 4 on the radome surface 2, with the result that during further operation the sensor can become blind, without this being noticed. That means that said sensor no longer receives reception signals allowing objects to be inferred, even though objects are present in the environment and the functioning of the sensor as envisaged is given. In order nevertheless to be able to recognize absorptive radome coatings 4, the two-dimensional velocity-distance spectrum output by the device 10 is subjected to a further evaluation.

For this purpose, this is carried out in a first step in the device 11, a mapping. This means that each value of the two-dimensional spectrum is fed as input value for a transfer function 12 and the output value of the transfer function 12 is assigned to the input value. In this case, the transfer function 12 can be any arbitrary continuous function, in particular rise and monotonically rising or falling function. The distribution function known from statistics, also as CDF (=Cumulative Distribution Function), has been found to be particularly suitable.

After said transfer function 12 has been mapped to the two-dimensional spectrum, in a second step, the two-dimensional spectrum is fed to a correlator, wherein a cross-correlation with one or more stored correlation matrices is carried out. This correlation matrix or these correlation matrices has/have for example forms of possible object detections in the two-dimensional spectrum. As a result of the cross-correlation with the correlation matrix or the correlation matrices, it is possible to recognize desired forms in the two-dimensional spectrum and thus to recognize object detections in the two-dimensional spectrum. These recognized objects can be output for further evaluation as output signal 15, for example for ascertaining the distance and the relative velocity of the objects detected.

Figure 2:
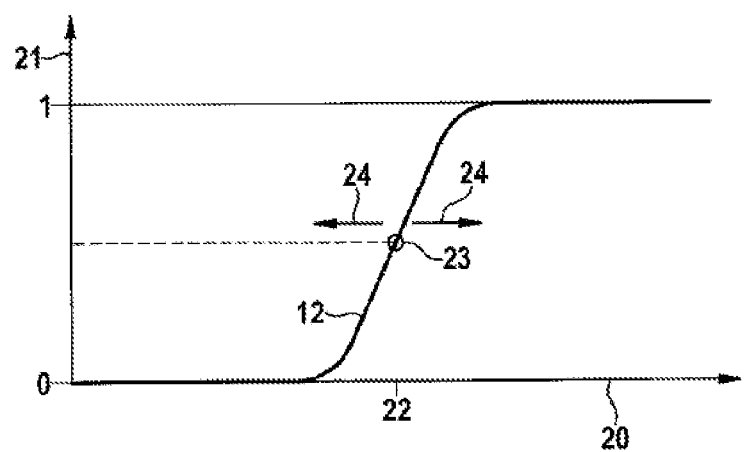
FIG. 2 shows a specific configuration of the transfer function in the form of a distribution function.

FIG. 2 illustrates a transfer function 12, which can be embodied for example as a distribution function CDF. The reception level of the two-dimensional spectrum after the 2D Fourier transformation has been carried out is plotted on the abscissa 20 of the diagram illustrated. A scale between 0 and 1, representing probability values of between 0 and 1, is presented on the ordinate 21. The distribution function 12 is present in the diagram such that it has a significance level 23. The latter can be chosen for example such that it corresponds to the value 0.5 on the ordinate 21. Said significance level 23 has a noise level 22 as assigned input value of the abscissa 20. By shifting the distribution function 12 toward the left or right, which is indicated by the arrows 24, the variability of the significance level is represented and can be set such that the noise level 22 can be set accordingly.

Figure 4:
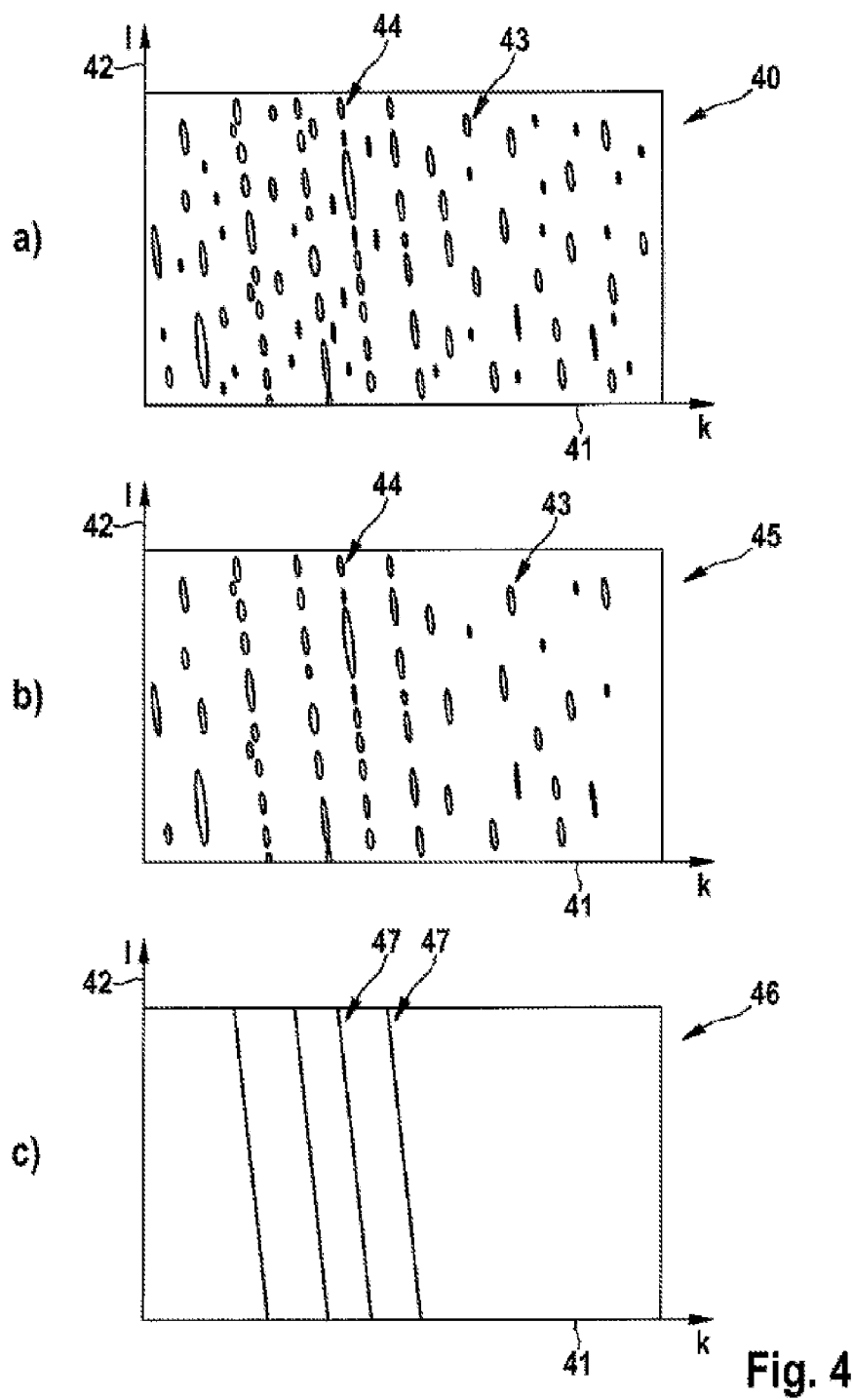
FIG. 4 shows two-dimensional velocity-distance spectra for elucidating the method according to the disclosure.

FIG. 4a illustrates a two-dimensional velocity-distance spectrum, which represents on the abscissa 41 the axis k, on which distance values or, in the case of discrete Fourier transformations, so-called distance bins represents. On the ordinate 42 in FIG. 4a, the second dimension of the spectrum is represented, namely the velocity values, which in turn represent so-called velocity bins in the case of a discrete Fourier transformation. The two-dimensional output spectrum 40 such as is output after the Fourier transformation of the apparatus 10 in accordance with FIG. 1 is plotted within the limits of this illustrated diagram. This spectrum contains intensity values 43, 44, which firstly are caused by noise, as was represented by the object 43, for example, but also stems from object detections, as was represented by the object signal 44. In the case of correspondingly high noise or correspondingly weak object signals, it is not possible for object signals and noise to be readily differentiated from one another. In the case, too, of a degradation of the sensor performance on account of an absorptive radome coating 4 on the radome 2, object detections 44 and noise 43 merge into one another in the two-dimensional output spectrum 40.

By applying the distribution function 12 in accordance with FIG. 2 to the spectrum illustrated in FIG. 4a, it is possible to set the noise level 22 accordingly by a suitable choice of the significance level 23. As a result, a large portion of the noise detections 43 is eliminated and the object detections 44 accordingly become better visible. This is illustrated in FIG. 4b, wherein the probability-mapped noise spectrum 45 is once again plotted in the two-dimensional spectrum of the distance bins 41 and velocity bins 42 on the axes k and l. This output signal of the device 11 in accordance with FIG. 1 is fed to the correlator 13, which correlates the two-dimensional spectrum in accordance with FIG. 4b with one correlation matrix or a plurality of correlation matrices in accordance with FIG. 3.

Figure 3:
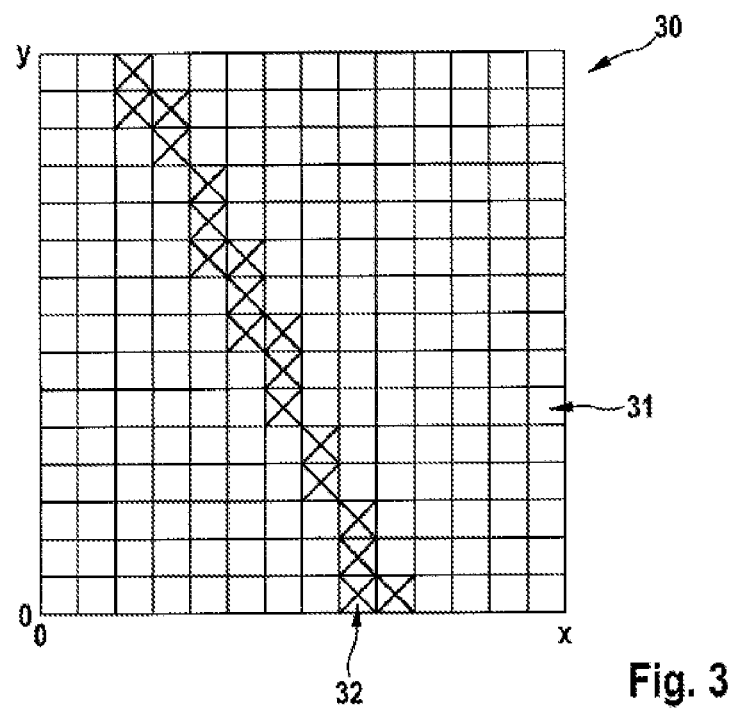
FIG. 3 shows an exemplary correlation matrix for a falling straight line.

In this respect, FIG. 3 illustrates an exemplary correlation matrix. The correlation matrix illustrated in FIG. 3 consists of columns 0 to x in the horizontal extent and of the rows 0 to y in the vertical extent. This grid structure of x·y cells can then be occupied in the individual cells, as is indicated by the cells 32, for example, or can be unoccupied, as is illustrated by the exemplary cell 31. In this case, the occupied cells 32 can have the value 1 and the unoccupied cells can have the value 0. Since the two-dimensional spectrum in FIG. 4b is a discrete two-dimensional spectrum, the correlation matrix 30 in FIG. 3 must likewise have discrete values. In this case, the cells of the correlation matrix 30 in FIG. 3 are occupied by the cells 32 such that said matrix has a falling straight line, for example, that is to say a straight line having a negative constant gradient. In the correlator 13 in accordance with FIG. 1, the spectrum of FIG. 4b is correlated by means of the correlation matrix 3 by correlation of individual segments of different sizes and different positions in the two-dimensional spectrum 45. If the correlation value rises, then the cell examined has a high degree of similarity with the form sought, as have the occupied cells 32 of the correlation matrix 30. By analysing the maximum values it is then possible to detect the form stored in the correlation matrix 30 within the two-dimensional spectrum. In the present example, that has the effect that the object detections 44 in FIG. 4b representing falling straight lines have high correlation values with the correlation matrix 30 in FIG. 3 and falling straight lines 47 in accordance with FIG. 4c are thus detected. No or only very low correlation values can be ascertained during the analysis of the noise detections 43 in FIG. 4b, and so these are not recognized as straight lines.

The two-dimensional spectrum illustrated in FIG. 4c thus represents the result of the correlator 13, which is output as output signal 15, for example, and has for example falling straight lines 47 which can be assigned to specific combinations of distance d and relative velocity v. In the event of a degradation of the sensor performance owing to the absorptive radome coating, the reception power falls to such a great extent that the object detections can scarcely still be detected in the noise. By shifting the significance level 23 in FIG. 2 for example by shifting the distribution function 12 in the direction 24, it is possible to lower the evaluated noise level to an extent such that object detections 44 can be reliably recognized, which gives rise to a sensor that functions reliably even under adverse conditions. By shifting the significance level 23 in FIG. 2 by shifting the distribution function 12 in one of the directions 24, it is possible to establish the degree of damping caused by the radome coating 4, by determining how far it is necessary to shift the distribution function 12 or the noise level 22 on the axis of the reception level 20.

What is claimed is:

1. A method for recognizing an absorptive radome coating on a radome that covers at least one antenna of an apparatus, comprising:
    emitting electromagnetic radar radiation using the at least one antenna;
    receiving a portion of the emitted electromagnetic radar radiation reflected by at least one object using the at least one antenna;
    mixing, with a mixer, a frequency-modulated transmission signal with the received portion of the emitted electromagnetic radar radiation;
    converting the mixed frequency-modulated transmission signal and received portion of the emitted electromagnetic radar radiation to a digital signal with an analog-to-digital converter;
    transforming the digital signal into a two-dimensional spectrum;
    mapping the two-dimensional spectrum with a transfer function;
    correlating the mapped two-dimensional spectrum with at least one correlation matrix; and
    using pattern recognition on the correlated mapped two-dimensional spectrum.

2. The method according to claim 1, wherein the two-dimensional spectrum is a velocity-distance spectrum.

3. The method according to claim 1, wherein the transfer function defines a noise level in the two-dimensional spectrum using a significance level.

4. The method according to claim 3, further comprising:
    identifying the at least one reflective object using the pattern recognition on the correlated mapped two-dimensional spectrum.

5. The method according to claim 4, wherein using pattern recognition further comprises:
    identifying linear correlations in the correlated mapped two-dimensional spectrum.

6. The method according to claim 5, wherein identifying the absorptive radome coating further comprises:
    determining a maxima of a cross-correlation from values of the mapped two-dimensional spectrum with values of the correlation matrix.

7. The method of claim 4, further comprising:
    varying the transfer function based upon the identified at least one reflective object.

8. The method of claim 1, wherein the transfer function is a distribution function.

9. The method of claim 1, further comprising:
    varying a significance level of the distribution function at predetermined distances; and
    deducing a damping of the radome coating based on a value of the significance level at which the correlated mapped two-dimensional spectrum is swamped in noise.

10. The method of claim 1, wherein the mixing, the converting, the transforming, the mapping, and the using are performed by executing with a processor program instructions stored in a memory.

11. The method of claim 1, further comprising:
    remapping the two-dimensional spectrum with the transfer function based upon the pattern recognition; and
    recognizing the absorptive radome coating based upon the remapping.

12. The method according to claim 11, wherein the transfer function defines a noise level in the two-dimensional spectrum using a significance level.

13. The method according to claim 12, further comprising:
    correlating the remapped two-dimensional spectrum with the at least one correlation matrix;
    using pattern recognition on the correlated remapped two-dimensional spectrum; and
    identifying the at least one reflective object using the pattern recognition on the correlated remapped two-dimensional spectrum.

14. The method of claim 13, wherein remapping the two-dimensional spectrum with the transfer function based upon the pattern recognition comprises:
    varying the transfer function based upon the pattern recognition used on the correlated mapped two-dimensional spectrum.

15. An apparatus for emitting electromagnetic radiation and receiving partial radiation reflected by objects, in particular radar radiation, comprising:
    at least one antenna covered by a radome and configured to receive the partial radiation reflected by objects;
    a mixer configured to mix a frequency-modulated transmission signal with the received partial radiation;
    an analog-to-digital converter configured to convert the mixed product of the mixer to a digitized signal;
    a device configured to calculate a two-dimensional spectrum of the digitized signal;
    a device configured to provide a transfer function; and
    a device configured to recognize patterns in the two-dimensional spectrum using the transfer function, wherein the apparatus is configured to recognize an absorptive radome coating.

16. An apparatus configured to emit electromagnetic radar radiation, comprising:
    at least one antenna covered by a radome and configured to receive a portion of the emitted electromagnetic radar radiation reflected by objects;
    a memory; and
    a processor operatively connected to the at least one antenna and the memory, and configured to execute program instructions stored in the memory to
        mix a frequency-modulated transmission signal with the received portion of the emitted electromagnetic radar radiation,
        convert the mixed frequency-modulated transmission signal and received portion of the emitted electromagnetic radar radiation to a digital signal,
        calculate a two-dimensional spectrum of the digitized signal,
        apply a transfer function to the calculated two-dimensional spectrum to map the two-dimensional spectrum,
        use pattern recognition on the mapped two-dimensional spectrum,
        apply a modified transfer function to the calculated two-dimensional spectrum to remap the two-dimensional spectrum based upon the pattern recognition based on the mapped two-dimensional spectrum, and
        recognize an absorptive radome coating based upon the modified transfer function.

17. The apparatus according to claim 16, wherein the transfer function defines a noise level in the two-dimensional spectrum using a significance level.

18. The apparatus according to claim 17, wherein the processor is further configured to execute program instructions stored in the memory to:
  use pattern recognition on the remapped two-dimensional spectrum; and
  identify the at least one reflective object using the pattern recognition used on the remapped two-dimensional spectrum.

19. The method of claim 18, wherein remapping the two-dimensional spectrum with the modified transfer function comprises:
  varying the transfer function based upon the pattern recognition used on the mapped two-dimensional spectrum.

* * * * *